US009923761B2

(12) United States Patent
Fleeman et al.

(10) Patent No.: US 9,923,761 B2
(45) Date of Patent: Mar. 20, 2018

(54) DIVERSE NETWORK PATHS WITH SITE HARDWARE REDUNDANCY FOR IMPROVED AVAILABILITY

(71) Applicant: Verizon Patent and Licensing Inc., Arlington, VA (US)

(72) Inventors: Danny M. Fleeman, McKinney, TX (US); Richard D. Hieb, Lake Dallas, TX (US); Joseph F. Thomasson, Allen, TX (US); Henry I. Peckaitis, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 105 days.

(21) Appl. No.: 14/921,467

(22) Filed: Oct. 23, 2015

(65) Prior Publication Data
US 2017/0118068 A1    Apr. 27, 2017

(51) Int. Cl.
 *H04L 12/28* (2006.01)
 *H04L 12/24* (2006.01)
 *H04L 12/751* (2013.01)
 *H04L 12/26* (2006.01)

(52) U.S. Cl.
 CPC ........ *H04L 41/0668* (2013.01); *H04L 41/085* (2013.01); *H04L 41/0846* (2013.01); *H04L 43/0805* (2013.01); *H04L 45/02* (2013.01)

(58) Field of Classification Search
 CPC ..... H04L 45/28; H04L 45/22; H04L 41/0654; H04L 41/0668; H04L 1/22; H04L 45/00; H04L 45/586

USPC ......................................................... 370/218
See application file for complete search history.

(56) References Cited

U.S. PATENT DOCUMENTS

| 7,036,051 | B1 * | 4/2006 | Fernandes | H04L 45/00 714/43 |
| 7,463,654 | B2 * | 12/2008 | Riegel | H04L 45/00 370/503 |
| 7,929,420 | B2 * | 4/2011 | Jesuraj | H04L 45/04 370/218 |

(Continued)

OTHER PUBLICATIONS

Hinden R., RFC 3758 "Virtual Router Redundancy Protocol (VRRP)," Apr. 2004, 27 pages.*

(Continued)

*Primary Examiner* — Andrew Chriss
*Assistant Examiner* — Lalita Pace

(57) ABSTRACT

A system may determine that a first device is available to transfer traffic via a network and that a second device is available to transfer the traffic via the network. A master mode may be enabled on the first device. The master mode, when enabled on the first device while both the first device and the second device are available to transfer the traffic, may cause the first device to advertise dynamic routing information associated with transferring the traffic. A slave mode may be enabled on the second device. The slave mode, when enabled on the second device, may cause the second device to suppress advertisement of virtual router redundancy protocol routing information associated with transferring the traffic. The system may provide, via the first device and the second device, the traffic via a dynamic network path across the network, and in accordance with the dynamic routing information.

20 Claims, 7 Drawing Sheets

(56) References Cited

U.S. PATENT DOCUMENTS

| | | | |
|---|---|---|---|
| 8,750,096 B2* | 6/2014 | Cirkovic | H04L 41/0654 370/220 |
| 2008/0186968 A1* | 8/2008 | Farinacci | H04L 45/58 370/392 |
| 2009/0252173 A1* | 10/2009 | Sampath | H04L 45/586 370/400 |
| 2010/0271933 A1* | 10/2010 | Li | H04L 45/00 370/219 |
| 2014/0321265 A1* | 10/2014 | Pitchai | G06F 11/2097 370/219 |
| 2014/0362681 A1* | 12/2014 | Bahadur | H04L 45/22 370/219 |
| 2016/0261487 A1* | 9/2016 | Singh | H04L 12/4641 |

OTHER PUBLICATIONS

Nadas, "Virtual Router Redundancy Protocol (VRRP) Version 3 for IPv4 and IPv6", https://tools.ietf.org/html/rfc5798, Mar. 2010, 80 pages.

* cited by examiner

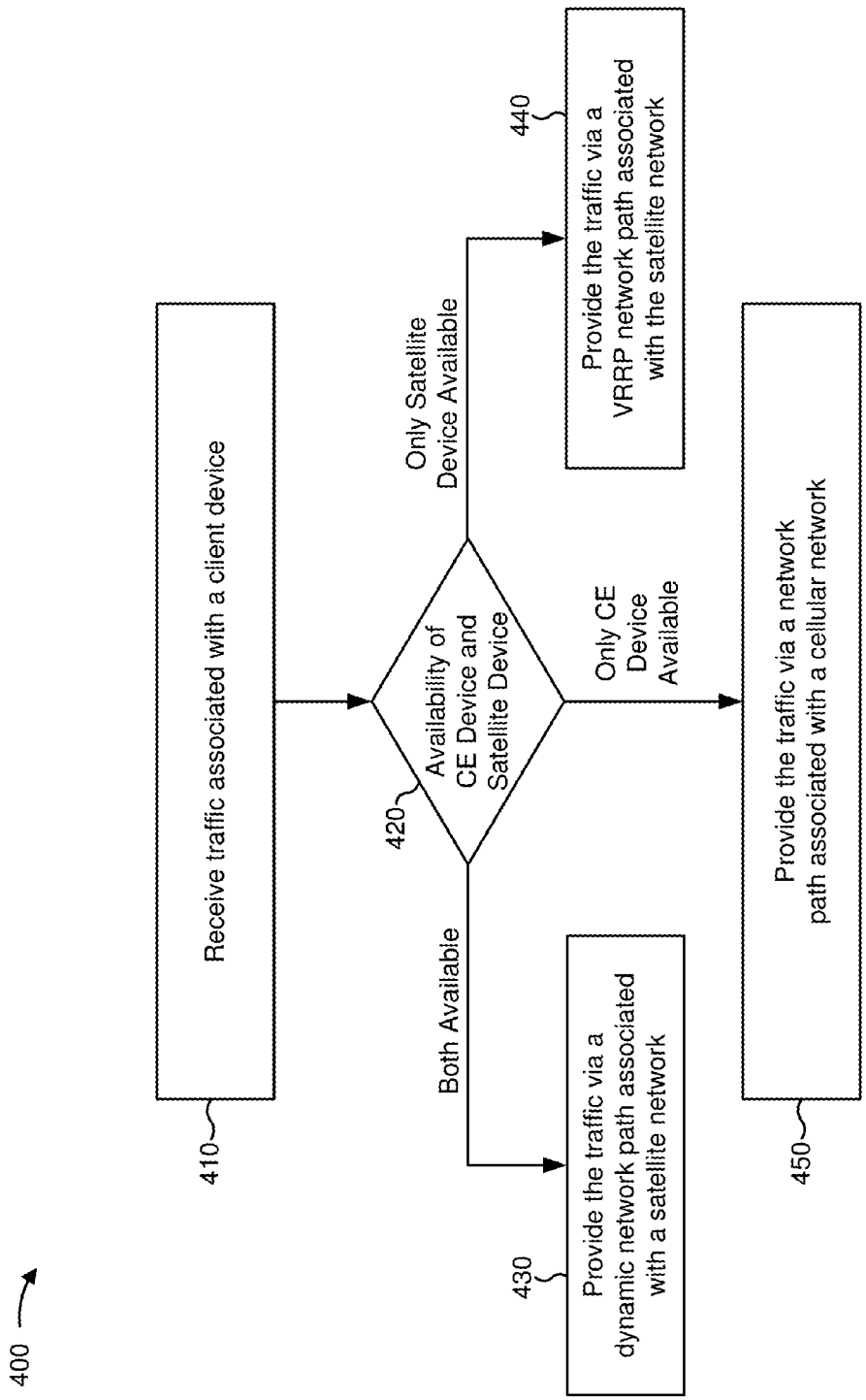

DIVERSE NETWORK PATHS WITH SITE HARDWARE REDUNDANCY FOR IMPROVED AVAILABILITY

BACKGROUND

Dynamic routing describes the ability of a network to alter a network route in response to a change in network conditions. As such, dynamic routing may allow network routes to remain valid in response to the change in the network conditions.

Virtual Router Redundancy Protocol is a computer networking protocol that dynamically assigns responsibility for a virtual router to a particular router of one or more routers (e.g., associated with a local area network (LAN)). VRRP may provide dynamic fail over of forwarding responsibility should the particular router become unavailable.

BRIEF DESCRIPTION OF THE DRAWINGS

FIG. 4 is a flow chart of an example process for providing traffic via a dynamic network path associated with a satellite network, a VRRP network path associated with the satellite network, or a path associated with a cellular network.

DETAILED DESCRIPTION OF PREFERRED EMBODIMENTS

The following detailed description of example implementations refers to the accompanying drawings. The same reference numbers in different drawings may identify the same or similar elements.

A service provider may operate one or more networks via which a client system (e.g., including one or more devices), associated with a customer of the service provider, may communicate with a remotely located (i.e., off site) server device. For example, the service provider may operate a satellite network, a cellular network, or the like, that allows the client system to communicate with a remotely located server device.

In some cases, the satellite network may be capable of supporting multiple (i.e., different) types of routing protocols associated with transferring traffic. For example, the satellite network may support a dynamic routing protocol (e.g., border gateway protocol (BGP), etc.) capable of transferring the traffic via a dynamic network path within the satellite network, a virtual router redundancy protocol (VRRP) capable of transferring the traffic via a VRRP network path within the satellite network, or the like. However, the dynamic network protocol and the VRRP may operate independently. In other words, the client system may implement the dynamic routing protocol for transfer of the traffic via the satellite network, or may implement VRRP for transfer of the traffic via the satellite network, but may not implement both. As such, it may not be possible for a client system to realize the benefits of both types of network paths. For example, if the client system implements the dynamic routing protocol, the client system may not realize hardware redundancy benefits associated with VRRP. As another example, if the client system implements VRRP, the client system may not be capable of controlling routing of the traffic as with the dynamic routing protocol (i.e., routing control may be undertaken by the service provider).

Moreover, if the client system is unable to transfer the traffic via the satellite network using either the dynamic routing protocol or the VRRP (e.g., when a device included in the satellite network fails), then the client system may be unable to transfer any traffic.

Implementations described herein provide a client system capable of using diverse network paths to transfer traffic via a satellite network while allowing the client system to control routing of the traffic and providing hardware redundancy. Implementations described herein may also allow the client system to transfer the traffic via a cellular network in the event that the client system is unable to transfer the traffic via the satellite network.

Figure 1A:
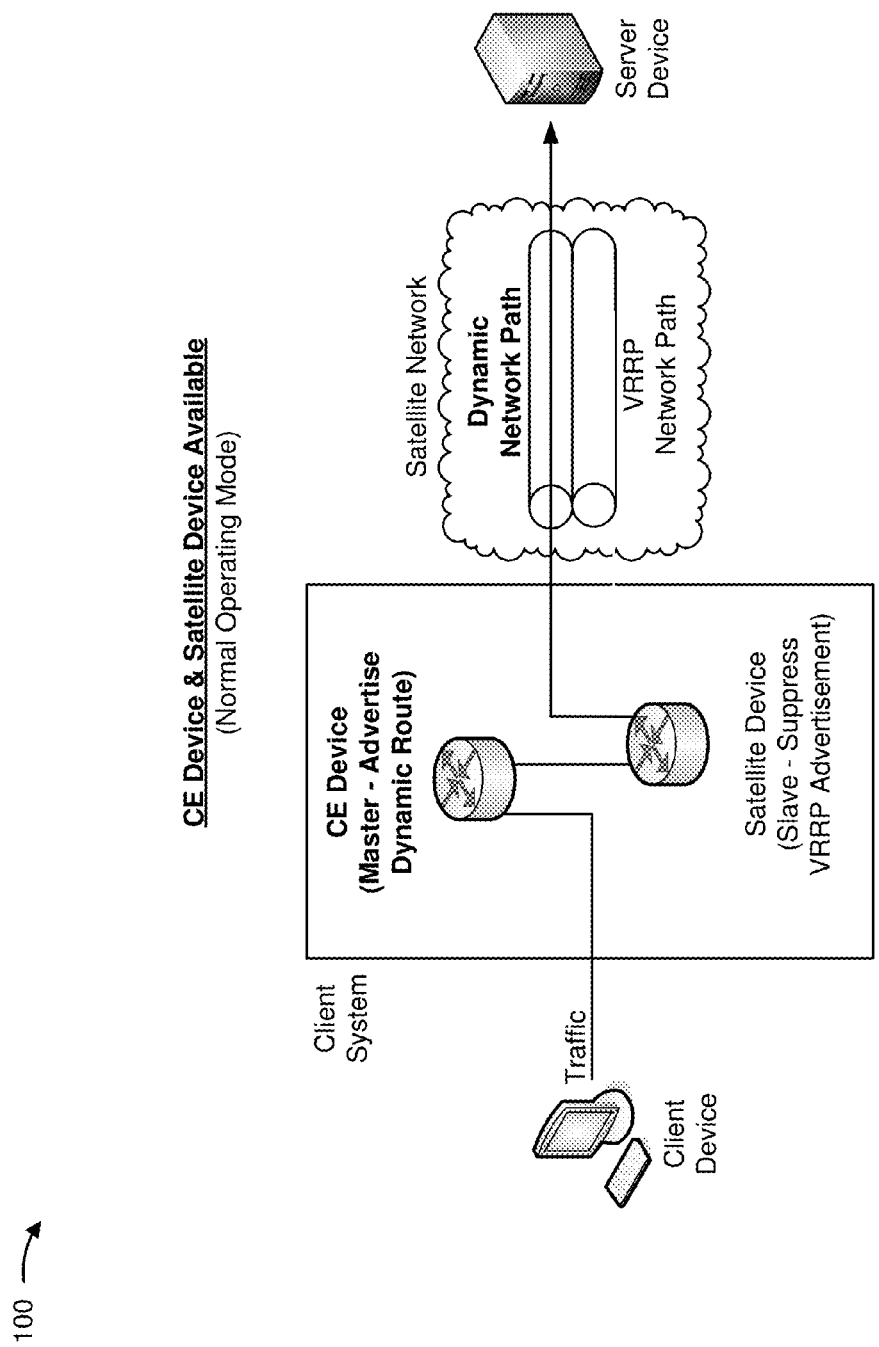
FIGS. 1A-1C are diagrams of an overview of an example implementation described herein.
Figure 1B:
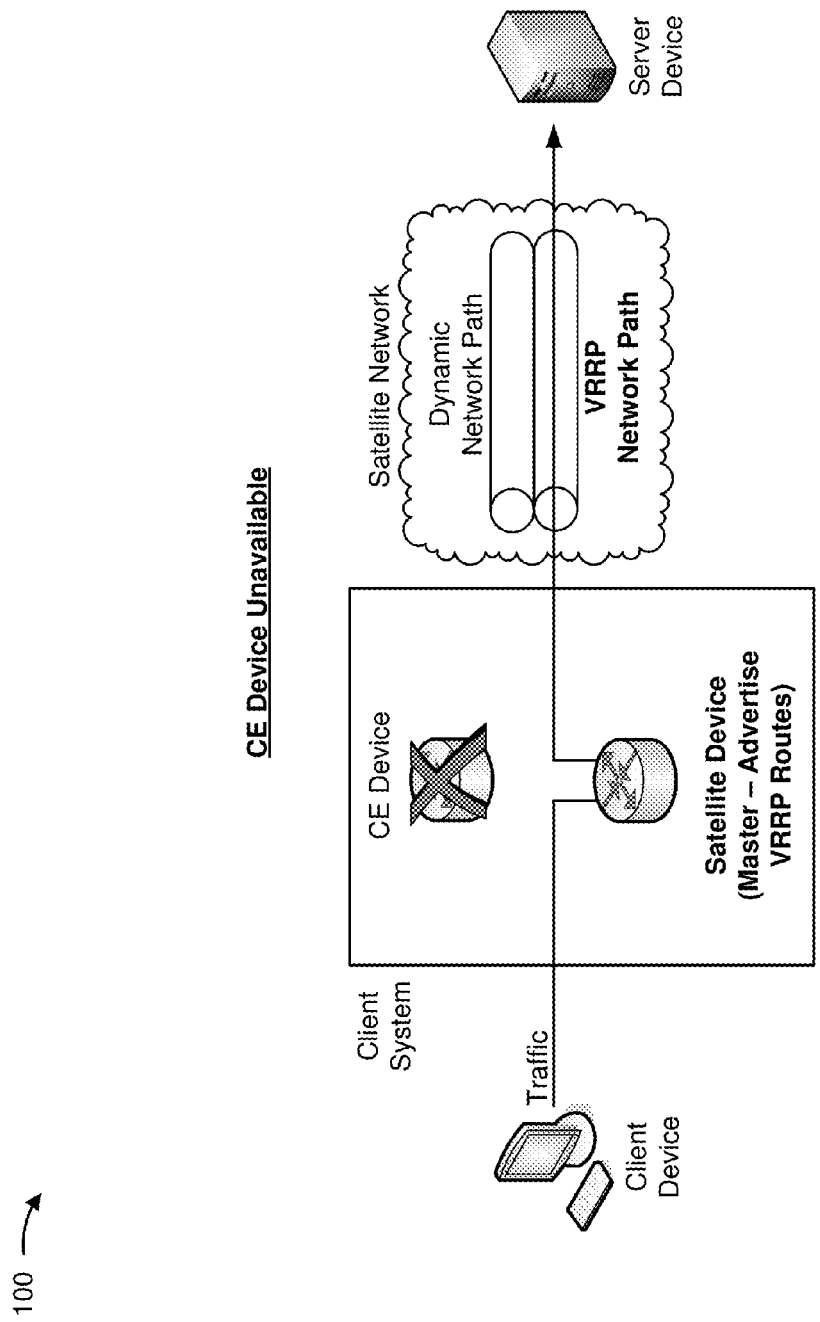
Figure 1C:
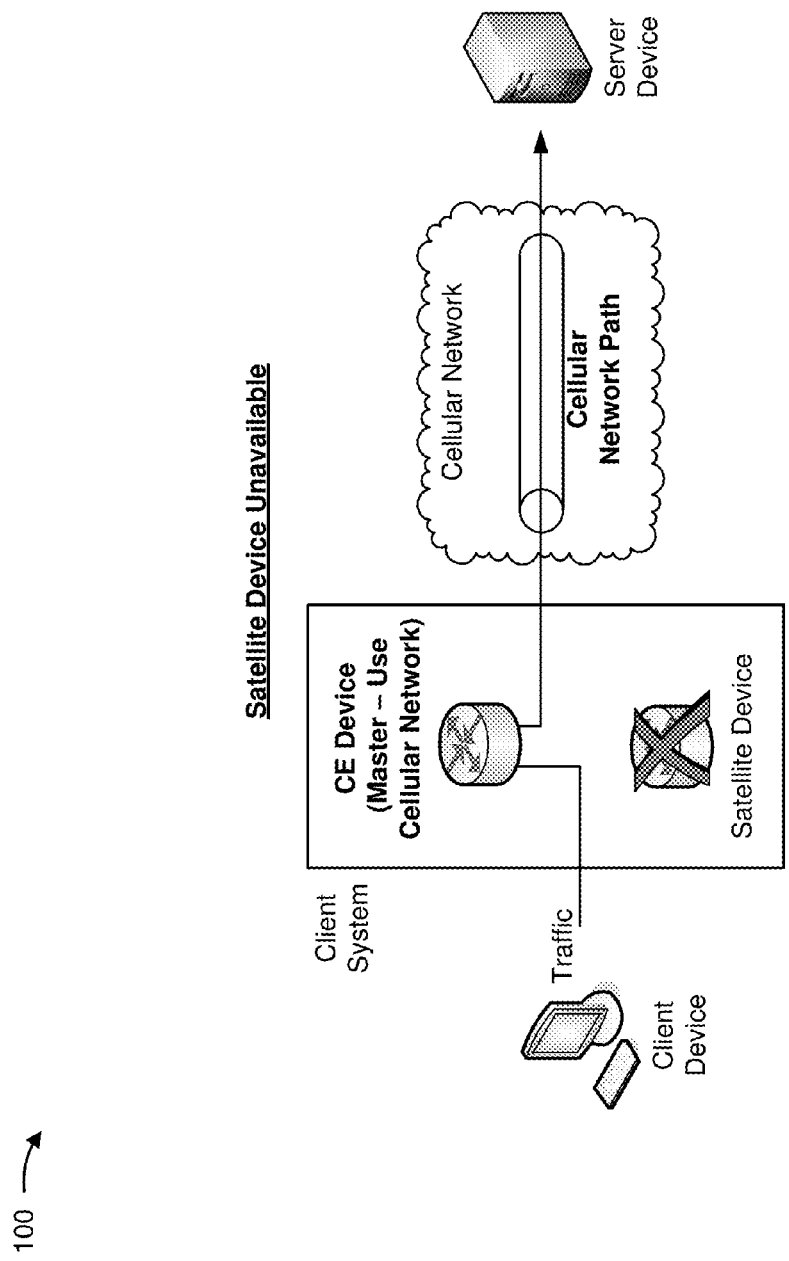

FIGS. 1A-1C are diagrams of an overview of an example implementation 100 described herein. For the purposes of example implementation 100, assume that a client device is to provide traffic to a remotely located server device via a client system that includes a client edge (CE) device and a satellite device. Further, assume that the client system is capable of communicating with the server device via a satellite network and a cellular network. Finally, assume that the satellite network supports use of a dynamic routing protocol when routing traffic via the satellite network, and the VRRP when routing traffic via the satellite network.

As shown in FIG. 1A, the client system may receive, from the client device, traffic that is to be provided to the server device. For the purposes of FIG. 1A, assume that, after receiving the traffic, the client system determines that both the CE device and the satellite device are available to transfer the traffic. As shown, based on determining that both the CE device and the satellite device are available to transfer the traffic (i.e., that the client system is in a normal operating mode), the client system may cause the CE device to enter a master mode and may cause the satellite device to enter a slave mode. In some implementations, the CE device may be in the master mode as a default (i.e., the client system may not need to cause the CE device to enter the master mode). Additionally, or alternatively, the satellite device may be in the slave mode as a default (i.e., the client system may not need to cause the satellite device to enter the slave mode).

The master mode, when enabled on the CE device while the client system is in the normal operating mode, may cause the CE device to advertise dynamic routing information, associated with a dynamic routing protocol (e.g., BGP), that allows the traffic to be transferred via a dynamic network path across the satellite network. The slave mode, when enabled on the satellite device, may cause the satellite device to suppress advertisement of VRRP routing information that may otherwise cause the traffic to be transferred via a VRRP network path across the satellite network.

As further shown, the client system may provide the traffic to the CE device. The CE device may forward the traffic to the satellite device and may advertise the dynamic routing information. As shown, the satellite device may then provide the traffic via the dynamic network path across the satellite network in accordance with the dynamic routing information. Notably, when the client system is in the normal operating mode, the satellite device suppresses advertisement of the VRRP routing information, which allows the traffic to be provided via the dynamic network path across the satellite network in accordance with the dynamic routing information provided by the CE device.

Alternatively, as shown in FIG. 1B, the client system may receive, from the client device, traffic that is to be provided to the server device. For the purposes of FIG. 1B, assume that, after receiving the traffic, the client system determines that the CE device is not available to transfer the traffic and that the satellite device is available to transfer the traffic. As shown, based on determining that the satellite device is available to transfer the traffic and the CE device is not available to transfer the traffic, the client system may cause the satellite device to enter the master mode. The master mode, when enabled on the satellite device, may cause the satellite device to advertise the VRRP routing information that allows the traffic to be transferred via the VRRP network path across satellite network.

As further shown, the client system may provide the traffic to the satellite device. The satellite device may advertise the VRRP routing information and provide the traffic via the VRRP network path across the satellite network. In this way, the client system may provide the traffic via the VRRP network path, associated with the satellite network, when dynamic routing is not possible (i.e., when the CE device is not available).

Alternatively, as shown in FIG. 1C, the client system may receive, from the client device, traffic that is to be provided to the server device. For the purposes of FIG. 1C, assume that, after receiving the traffic, the client system determines that the CE device is available to transfer the traffic and that the satellite device is not available to transfer the traffic (e.g., that the satellite device is not available and/or that another device, associated with the satellite network, is not available). As shown, based on determining that the CE device is available to transfer the traffic and that the satellite device is not available to transfer the traffic, the client system may cause the CE device to enter the master mode. The master mode, when enabled on the CE device when the satellite device is not available to transfer the traffic (i.e., when only the CE device is available), may cause the CE device to set up a cellular network path, across the cellular network, using a mobile routing protocol, such as a dynamic mobile network routing (DMNR) protocol (e.g., such that the traffic may be provided via the cellular network).

As further shown, the client system may provide the traffic to the CE device. The CE device may set up the cellular network path using the mobile routing protocol, and provide the traffic via the cellular network path across the cellular network. In this way, the client system may provide the traffic via the cellular network when dynamic routing and VRRP routing are not possible (e.g., when the satellite device and/or another device associated with the satellite network is not available).

As indicated above, FIGS. 1A-1C are provided merely as examples. Other examples are possible and may differ from what was described with regard to FIGS. 1A-1C.

In this way, a client system may use diverse network paths to transfer traffic via a satellite network while allowing the client system to control routing of the traffic and providing hardware redundancy. Moreover, in the event that the client system is unable to transfer the traffic via the satellite network, the client system may transfer the traffic via a cellular network.

Figure 2:
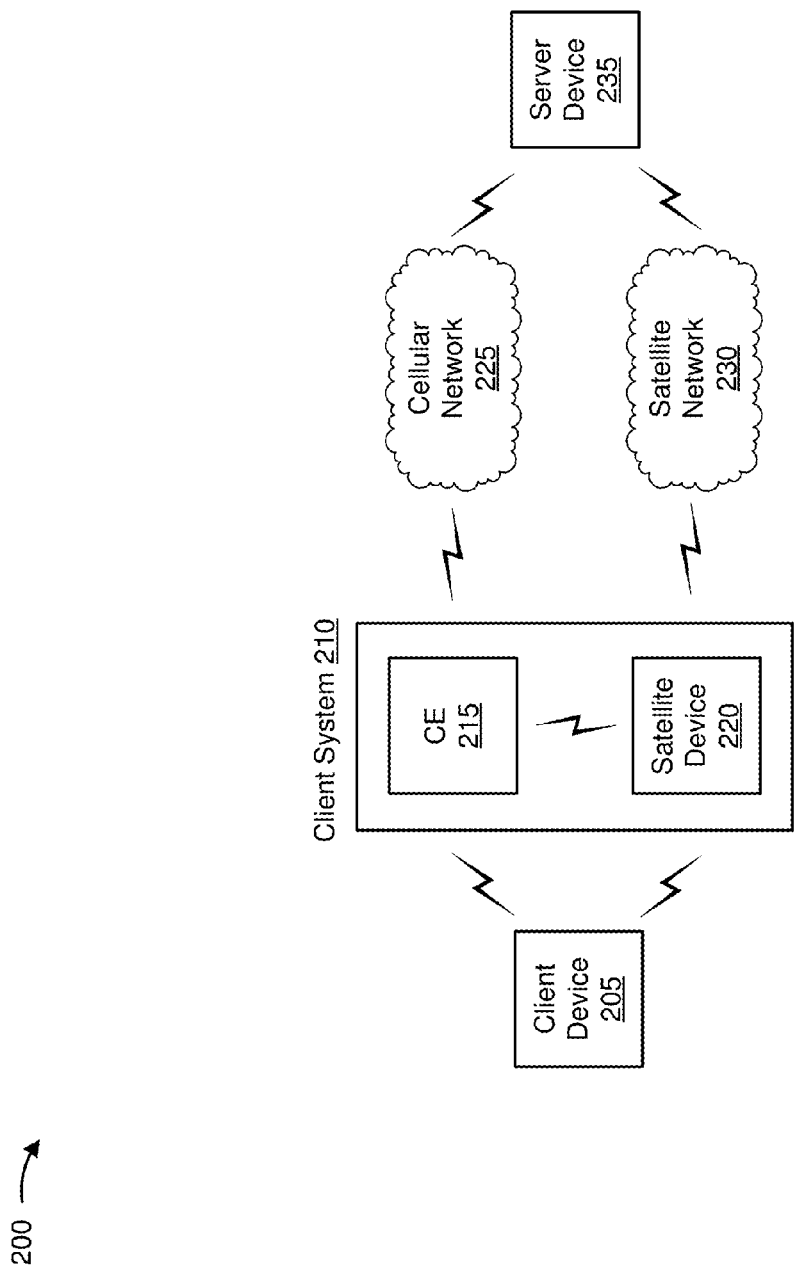
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 205, a client system 210 that includes a CE device 215 and a satellite device 220, a cellular network 225, a satellite network 230, and a server device 235. Devices of environment 200 may interconnect via wired connections, wireless connections, or a combination of wired and wireless connections.

Client device 205 may include one or more devices capable of receiving, generating, storing, processing, and/or providing traffic via client system 210. For example, client device 205 may include a communication and computing device, such as a mobile phone (e.g., a smart phone, a radiotelephone, etc.), a desktop computer, a laptop computer, a tablet computer, a handheld computer, a wearable device (e.g., a smart watch), a set-top box, a gaming device, a server, or a similar type of device. In some implementations, client device 205 may receive and/or transmit information via client system 210.

Client system 210 may include one or more devices capable of receiving and/or providing traffic destined for and/or provided by client device 205 via one or more networks, such as cellular network 225 or satellite network 230. For example, client system may include one or more network devices included in a local area network (LAN), such as a switch, a router, a gateway, a hub, a bridge, a reverse proxy, a server (e.g., a proxy server), a security device, or the like. In some implementations, client system 210 may include client device 205, CE device 215, satellite device 220, and/or one or more other devices.

CE device 215 may include one or more devices capable of processing and transferring traffic associated with client system 210. For example, CE device 215 may include a router, a gateway, a switch, a hub, a bridge, a reverse proxy, a server (e.g., a proxy server), or a similar device. In some implementations, CE device 215 may be capable of implementing a dynamic routing protocol such that traffic, associated with client system 210, traverses satellite network 230 via a dynamic network path (e.g., by advertising dynamic routing information associated with the dynamic routing protocol). Additionally, or alternatively, CE device 215 may be capable of routing traffic via a cellular network path associated with cellular network 225 (e.g., using the DMNR protocol). In some implementations, CE device 215 may be owned, managed, and/or operated by a customer associated with client system 210.

Satellite device 220 may include one or more devices capable of processing and transferring traffic associated with client system 210. For example, satellite device 220 may include a router, a gateway, a switch, a hub, a bridge, a reverse proxy, a server (e.g., a proxy server), or a similar device. In some implementations, satellite device 220 may be capable implementing the VRRP such that traffic, associated with client system 210, traverses satellite network 230 via a VRRP network path (e.g., by advertising VRRP routing information associated with VRRP). In some implementations, satellite device 220 may be owned, managed, and/or operated by the service provider associated with satellite network 230.

Cellular network 225 may include a cellular network via which traffic, associated with client system 210, may be transferred. For example, cellular network 225 may include a long-term evolution (LTE) network, a 3G network, a code division multiple access (CDMA) network, or the like. In some implementations, cellular network 225 may support a mobile routing protocol for transferring traffic, such as DMNR.

Satellite network 230 may include a satellite network via which traffic may be transferred. For example, satellite network 230 may be a network that supports communication via one or more orbital satellites. In some implementations, satellite network 230 may include satellite device 220, one or more satellite dishes, one or more orbital satellites, or the like. In some implementations, satellite network 230 may support a dynamic routing protocol (e.g., BGP) for transferring traffic and the VRRP protocol for transferring the traffic.

Server device 235 may include one or more devices associated with sending and/or receiving traffic to and/or from client system 210 associated with client device 205. For example, server device 235 may include a server or a group of servers. In some implementations, server device 235 may be capable of communicating with client device 205 via cellular network 225 and/or satellite network 230.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3A:
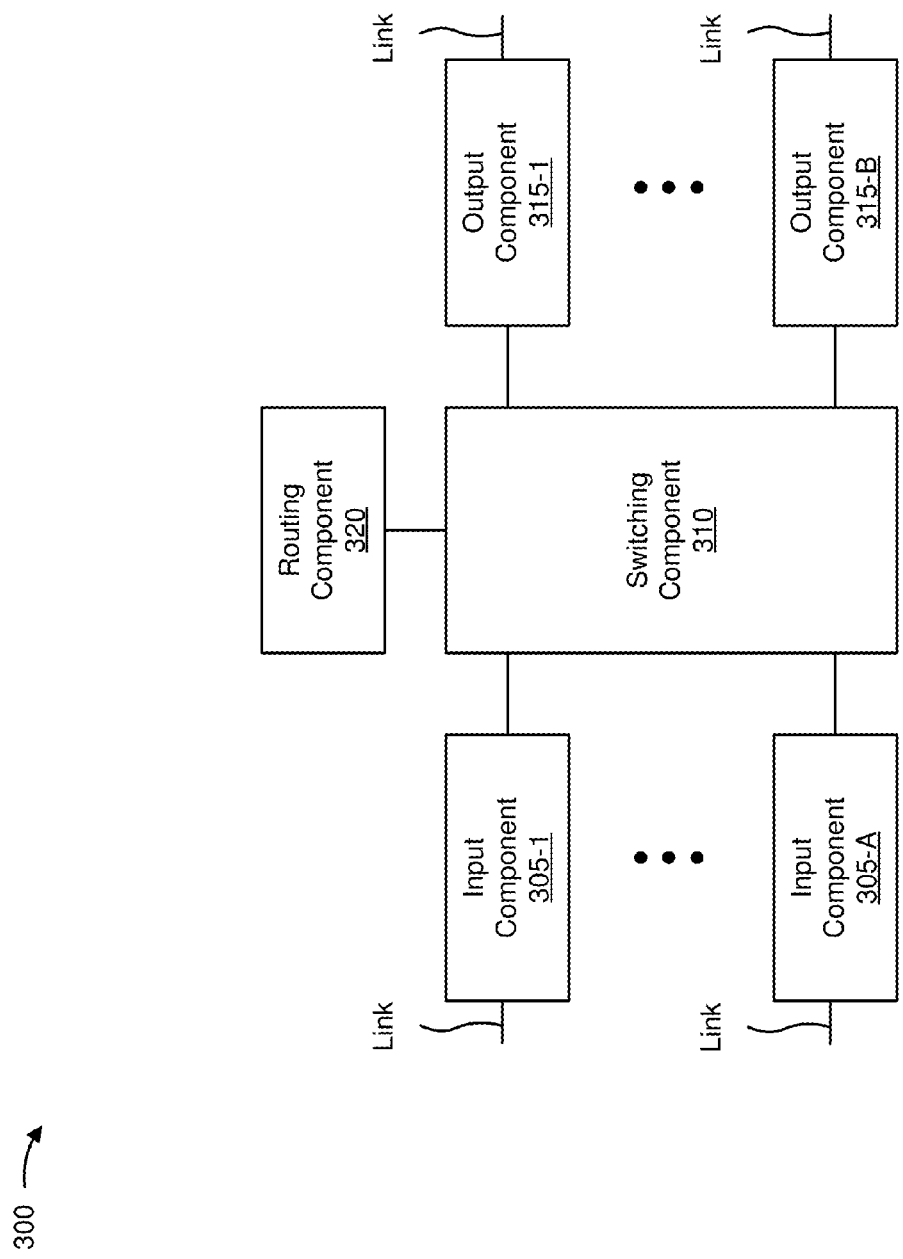
FIGS. 3A and 3B are diagrams of example components of one or more devices of FIG. 2.

FIG. 3A is a diagram of example components of a device 300. Device 300 may correspond to client system 210, CE device 215, and/or satellite device 220. In some implementations, client system 210, CE device 215, and/or satellite device 220 may include one or more devices 300 and/or one or more components of device 300. As shown in FIG. 3A, device 300 may include one or more input components 305-1 through 305-A (A≥1) (hereinafter referred to collectively as input components 305, and individually as input component 305), a switching component 310, one or more output components 315-1 through 315-B (B≥1) (hereinafter referred to collectively as output components 315, and individually as output component 315), and a routing component 320.

Input component 305 may include points of attachment for links (e.g., physical links, wireless links, etc.) and may be points of entry for traffic, such as packets. Input component 305 may process received traffic, such as by performing data link layer encapsulation or decapsulation. In some implementations, input component 305 may send packets to output component 315 via switching component 310.

Switching component 310 may interconnect input components 305 with output components 315. Switching component 310 may be implemented using one or more of multiple, different techniques. For example, switching component 310 may be implemented via busses, via crossbars, and/or with shared memories. The shared memories may act as temporary buffers to store traffic from input components 305 before the traffic is eventually scheduled for delivery to output components 315. In some implementations, switching component 310 may enable input components 305, output components 315, and/or routing component 320 to communicate.

Output component 315 may include points of attachment for links (e.g., wireless links, physical links, etc.) and may be points of exit for traffic, such as packets. Output component 315 may store packets and may schedule packets for transmission on output physical links. Output component 315 may include scheduling algorithms that support priorities and guarantees. Output component 315 may support data link layer encapsulation or decapsulation, and/or a variety of higher-level protocols. In some implementations, output component 315 may send packets and/or receive packets.

Routing component 320 may include one or more processors, microprocessors, field-programmable gate arrays (FPGAs), application-specific integrated circuit (ASICs), or similar types of processing components. In some implementations, routing component 320 may communicate with other devices, networks, and/or systems connected to device 300 to exchange information regarding network topology. Routing component 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming packets.

The number and arrangement of components shown in FIG. 3A are provided as an example. In practice, device 300 may include additional components, fewer components, different components, or differently arranged components than those shown in FIG. 3A. Additionally, or alternatively, a set of components (e.g., one or more components) of device 300 may perform one or more functions described as being performed by another set of components of device 300.

Figure 3B:
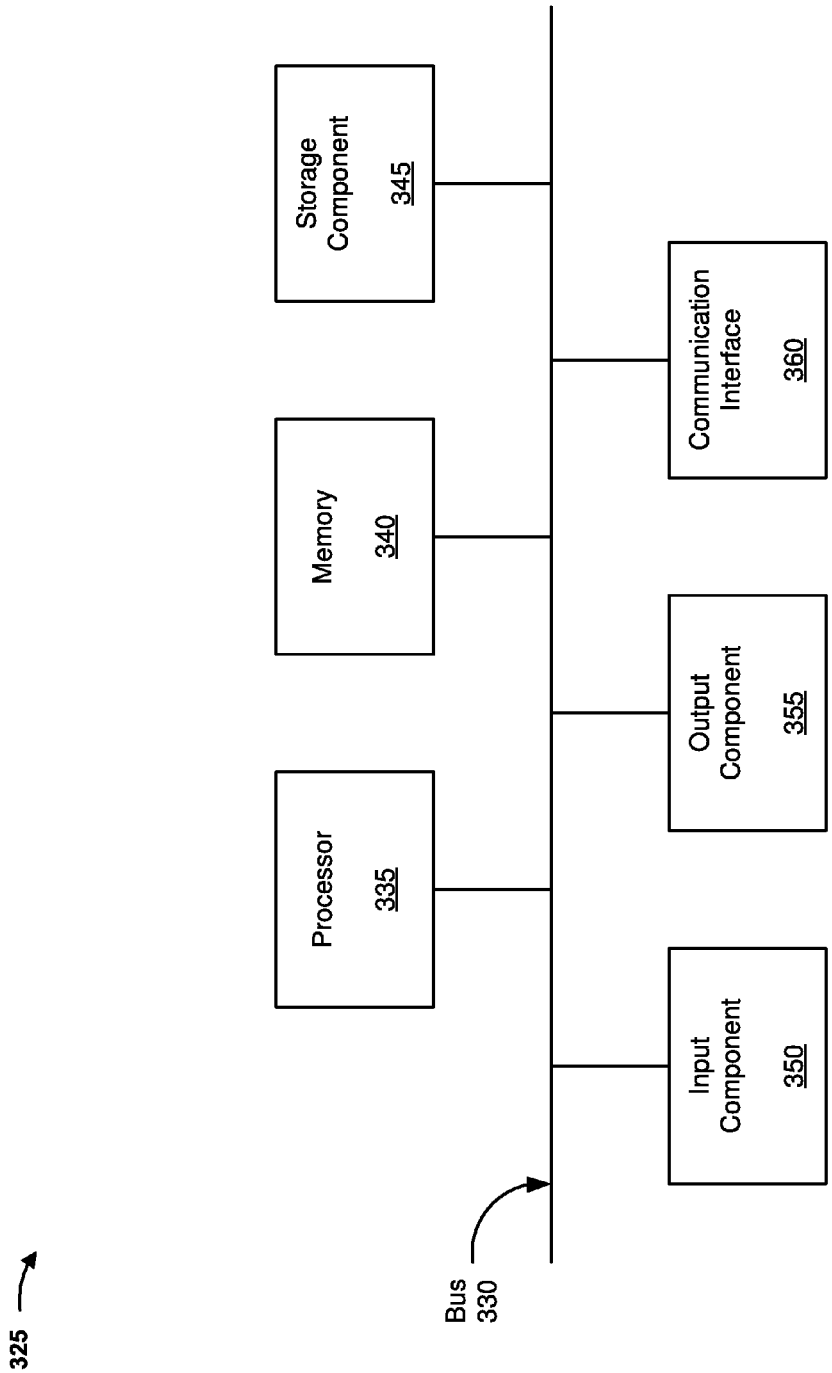

FIG. 3B is a diagram of example components of a device 325. Device 325 may correspond to client device 205, client system 210, and/or server device 235. In some implementations, client device 205, client system 210, and/or server device 235 may include one or more devices 325 and/or one or more components of device 325. As shown in FIG. 3B, device 325 may include a bus 330, a processor 335, a memory 340, a storage component 345, an input component 350, an output component 355, and a communication interface 360.

Bus 330 may include a component that permits communication among the components of device 325. Processor 335 is implemented in hardware, firmware, or a combination of hardware and software. Processor 335 may include a processor (e.g., a central processing unit (CPU), a graphics processing unit (GPU), an accelerated processing unit (APU), etc.), a microprocessor, and/or any processing component (e.g., an FPGA, an ASIC, etc.) that interprets and/or executes instructions. In some implementations, processor 335 may include one or more processors that are programmed to perform a function. Memory 340 may include a random access memory (RAM), a read only memory (ROM), and/or another type of dynamic or static storage device (e.g., a flash memory, a magnetic memory, an optical memory, etc.) that stores information and/or instructions for use by processor 335.

Storage component 345 may store information and/or software related to the operation and use of device 325. For example, storage component 345 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 325 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 355 may include a component that provides output information from device 325 (e.g., a display, a speaker, one or more light-emitting diodes (LEDs), etc.).

Communication interface 360 may include a transceiver-like component (e.g., a transceiver, a separate receiver and transmitter, etc.) that enables device 325 to communicate with other devices, such as via a wired connection, a wireless connection, or a combination of wired and wireless connections. Communication interface 360 may permit device 325 to receive information from another device and/or provide information to another device. For example, communication interface 360 may include an Ethernet interface, an optical interface, a coaxial interface, an infrared interface, a radio frequency (RF) interface, a universal serial bus (USB) interface, a Wi-Fi interface, a cellular network interface, or the like.

Device 325 may perform one or more processes described herein. Device 325 may perform these processes in response to processor 335 executing software instructions stored by a computer-readable medium, such as memory 340 and/or storage component 345. A computer-readable medium is defined herein as a non-transitory memory device. A memory device includes memory space within a single physical storage device or memory space spread across multiple physical storage devices.

Software instructions may be read into memory 340 and/or storage component 345 from another computer-readable medium or from another device via communication interface 360. When executed, software instructions stored in memory 340 and/or storage component 345 may cause processor 335 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3B are provided as examples. In practice, device 325 may include additional components, fewer components, different components, or differently arranged components than those shown in FIG. 3B. Additionally, or alternatively, a set of components (e.g., one or more components) of device 325 may perform one or more functions described as being performed by another set of components of device 325.

FIG. 4 is a flow chart of an example process 400 for providing traffic via a dynamic network path associated with a satellite network, a VRRP network path associated with the satellite network, or a path associated with a cellular network. In some implementations, one or more process blocks of FIG. 4 may be performed by client system 210. In some implementations, one or more process blocks of FIG. 4 may be performed by another device or a group of devices separate from or including client system 210, such as client device 205, CE device 215, satellite device 220, and/or another device or group of devices of environment 200.

As shown in FIG. 4, process 400 may include receiving traffic associated with a client device (block 410). For example, client system 210 may receive traffic associated with client device 205. In some implementations, client system 210 may receive the traffic when client device 205 provides the traffic (e.g., automatically, based on user input, etc.). In some implementations, the traffic may be destined for server device 235.

As further shown in FIG. 4, process 400 may include determining whether a CE device, associated with the client system, and a satellite device, associated with the client system, are available to transfer the traffic (block 420). For example, client system 210 may determine whether CE device 215 and satellite device 220 are available to transfer the traffic. In some implementations, client system 210 may determine whether CE device 215 and satellite device 220 are available to transfer the traffic when client system 210 receives the traffic associated with client device 205. Additionally, or alternatively, client system 210 may determine whether CE device 215 and satellite device 220 are available to transfer the traffic when client system 210 receives information indicating that client system 210 is to determine whether CE device 215 and satellite device 220 are available to transfer the traffic, such as based on information indicating that client system 210 is to periodically (e.g., once every minute, once every 30 minutes, etc.) determine whether CE device 215 and satellite device 220 are available to transfer the traffic.

In some implementations, client system 210 may determine whether CE device 215 is available to transfer the traffic based on information associated with CE device 215. For example, client system 210 may determine whether CE device 215 is available based on information (e.g., automatically) provided by CE device 215 (e.g., when CE device 215 is configured to periodically provide information associated with availability of CE device 215, such as once every 30 seconds, once every one minute, once every five minutes, when CE device 215 is configured to provide updated availability information when CE device 215 experiences a change in operation state, a failure, an error, etc.). As another example, client system 210 may determine whether CE device 215 is available based on a response, provided by CE device 215, to a request provided by client system 210 (e.g., when client system 210 requests information associated with availability of CE device 215), or a lack of a response within a threshold amount of time (e.g., indicating that CE device 215 may be powered-off).

In some implementations, client system 210 may determine whether CE device 215 is available based on information, associated with the availability of CE device 215. For example, client system 210 may determine whether CE device 215 is available based on information indicating whether CE device 215 is powered-on, information indicating whether CE device 215 is in an operational state, information associated with a failure and/or an error experienced by CE device 215, information associated with an amount of available resources of CE device 215 (e.g., processing resources, memory resources, bandwidth, etc.), or the like. Here, client system 210 may determine that CE device 215 is available when CE device 215 is powered-on, is in an operational state, has not experienced a failure and/or an error, and has sufficient available resources (e.g., an amount of resources that satisfies a threshold). Conversely, client system 210 may determine that CE device 215 is not available when CE device 215 is not powered-on, is not in an operational state, has experienced a failure or an error, or does not have sufficient available resources.

In some implementations, client system 210 may determine whether satellite device 220 is available to transfer the traffic in a manner similar to that as described above with regard to CE device 215.

Additionally, or alternatively, client system 210 may determine whether satellite device 220 is available to transfer the traffic based on information associated with satellite network 230. For example, client system 210 may receive information indicating that a device within satellite network 230, via which the traffic is to be provided, is powered-off, is not in an operational state, has experienced a failure and/or an error, is lacking sufficient resources, or the like. Here, client system 210 may determine that satellite device 220 is not available to transfer the traffic based on the information associated with satellite network 230 (i.e., client system 210 may determine that satellite device 220 is not available when the device within satellite network 230 is not available).

In some implementations, client system 210 may determine whether satellite device 220 is available to transfer the traffic when (e.g., before, after, concurrently with, etc.) client system 210 determines whether CE device 215 is available to transfer the traffic.

As further shown in FIG. 4, if both the CE device and the satellite device are available to transfer the traffic, then process 400 may include providing the traffic via a dynamic network path associated with a satellite network (block 430). For example, if both CE device 215 and satellite device 220 are available to transfer the traffic, then client system 210 may provide the traffic via a dynamic network path associated with satellite network 230. In some implementations, when client system 210 determines that both CE device 215 and satellite device 220 are available to transfer the traffic, client system 210 may be described as being in a "normal operating mode."

In some implementations, based on determining that both CE device 215 and satellite device 220 are available to transfer the traffic (i.e., when client system 210 is in the normal operating mode), the dynamic network path, associated with satellite network 230, may be used to transfer the traffic. The dynamic network path may be a network path, associated with a dynamic routing protocol (e.g., BGP), across satellite network 230 via which the traffic may be transferred.

In some implementations, based on determining that both CE device 215 and satellite device 220 are available to transfer the traffic, client system 210 may cause CE device 215 to enter a master mode, and may cause satellite device 220 to enter a slave mode. In some implementations, the master mode may be enabled on CE device 215 as a default (i.e., client system 210 may not need to cause CE device 215 to enter the master mode). Additionally, or alternatively, the slave mode may be enabled on satellite device 220 as a default (i.e., client system 210 may not need to cause satellite device 220 to enter the slave mode).

The master mode, when enabled on CE device 215 while client system 210 is in the normal operating mode, may cause CE device 215 to advertise dynamic routing information that allows the traffic to be transferred via the dynamic network path. The slave mode, when enabled on satellite device 220, may cause satellite device 220 to suppress advertisement of VRRP routing information that would cause the traffic to be transferred via a VRRP network path.

In other words, while in the normal operating mode, CE device 215 may implement the dynamic routing protocol in order to dynamically control routing of the traffic, while the VRRP may not be used. Here, satellite device 220 may be configured with a VRRP/dynamic routing capability that allows satellite device 220 to support use of both the dynamic network path and the VRRP network path, but causes satellite device 220 to suppress use of the VRRP path when client system 210 is in normal operating mode (i.e., when satellite device 220 is in the slave mode).

In some implementations, when CE device 215 is in the master mode and satellite device 220 is in the slave mode, CE device 215 may receive the traffic from client device 205 and provide the traffic to satellite device 220. Here, since satellite device 220 is in the slave mode (e.g., such that satellite device 220 suppresses advertisement of the VRRP routing information), satellite device 220 may forward the traffic such that the traffic travels via the dynamic network path in accordance with the dynamic routing information advertised by CE device 215. In this way, client system 210 may provide the traffic via the dynamic network path, associated with satellite network 230, when client system 210 is in the normal operating mode. Furthermore, CE device 215 may control routing of the traffic even when using dynamic routing over satellite. An example case in which the traffic is provided via the dynamic network path is described above with regard to FIG. 1A.

As further shown in FIG. 4, if the CE device is not available to transfer the traffic and the satellite device is available to transfer the traffic, then process 400 may include providing the traffic via a VRRP network path associated with the satellite network (block 440). For example, client system 210 may determine that CE device 215 is not available to transfer the traffic and that satellite device 220 is available to transfer the traffic, and client system 210 may provide the traffic via the VRRP network path associated with satellite network 230.

In some implementations, based on determining that CE device 215 is not available and that satellite device 220 is available (i.e., that only satellite device 220 is available), client system 210 may provide the traffic such that the traffic travels via the VRRP network path associated with satellite network 230. The VRRP network path may be a network path, associated with VRRP, across satellite network 230 via which the traffic may be transferred.

In some implementations, based on determining that only satellite device 220 is available to transfer the traffic, client system 210 may cause satellite device 220 to enter the master mode. The master mode, when enabled on satellite device 220, may cause satellite device 220 to advertise the VRRP routing information that allows the traffic to be transferred via the VRRP network path associated with satellite network 230. In other words, enabling the master mode on satellite device 220 may cause satellite device 220 to cease suppressing advertisement of the VRRP routing information. By allowing the VRRP to be implemented when dynamic routing is unavailable, client system 210 may achieve hardware redundancy. In other words, the traffic may still be provided to server device 235 even when CE device 215 is not available.

In some implementations, when satellite device 220 is in the master mode, satellite device 220 may receive the traffic from client device 205 (e.g., rather than CE device 215 as in the normal operating mode), and may advertise the VRRP routing information and provide the traffic such that the traffic travels via the VRRP network path in accordance with the VRRP routing information. In this way, client system 210 may provide the traffic via the VRRP network path, associated with satellite network 230, when only satellite device 220 is available to transfer the traffic. An example case in which the traffic is provided via the VRRP network path is described above with regard to FIG. 1B.

As further shown in FIG. 4, if the CE device is available to transfer the traffic and the satellite device is not available to transfer the traffic, then process 400 may include providing the traffic via a cellular network path associated with a cellular network (block 450). For example, client system 210 may determine that CE device 215 is available to transfer the traffic and that satellite device 220 is not available to transfer the traffic, and client system 210 may provide the traffic via a network path associated with a cellular network.

In some implementations, based on determining that CE device 215 is available and that satellite device 220 is not available (i.e., that only CE device 215 is available), client system 210 may use the cellular network path, associated with cellular network 225, to transfer the traffic. The cellular network path may be a network path, associated with a mobile routing protocol (e.g., DMNR), across cellular network 225 via which the traffic may be transferred.

In some implementations, based on determining that only CE device 215 is available to transfer the traffic, client system 210 may cause CE device 215 to remain in the master mode. The master mode, when enabled on CE device 215 when only CE device 215 is available to transfer the traffic, may cause CE device 215 to set up the cellular network path using the mobile routing protocol such that the traffic may be transferred via the cellular network path associated with cellular network 225. In this way, the traffic may be provided to server device 235 even when satellite device 220 and/or a device associated with satellite network 230 is not available to transfer the traffic.

In some implementations, when only CE device 215 is available and CE device 215 is in the master mode, CE device 215 may receive the traffic from client device 205, and may set up the cellular network path such that the traffic travels via cellular network 225. In this way, client system 210 may provide the traffic via cellular network 225 when only CE device 215 is available to transfer the traffic. An example case in which the traffic is provided via cellular network 225 is described above with regard to FIG. 1C.

In some implementations, when CE device 215 determines that neither CE device 215 nor satellite device 220 is available to transfer the traffic, client system 210 may be unable to provide the traffic. In such a case, client system 210 may repeat process 400 until client system 210 determines that one or both of CE device 215 and satellite device 220 are available such that client system 210 may provide the traffic.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein provide a client system capable of using diverse network paths to transfer traffic via a satellite network while allowing the client system to control routing of the traffic and providing hardware redundancy. Implementations described herein may also allow the client system to transfer the traffic via a cellular network in the event that the client system is unable to transfer the traffic via the satellite network.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   determining, by one or more devices and at a first time, that a first device, of the one or more devices, is available to transfer traffic via a first network and that a second device, of the one or more devices, is available to transfer the traffic via the first network;
   causing, by the one or more devices and based on the first device and the second device being available to transfer the traffic via the first network, a master mode to be enabled on the first device,
      the master mode causing the first device to advertise first routing information that allows the traffic to be transferred via a dynamic routing protocol path of the first network;

causing, by the one or more devices and based on the first device and the second device being available to transfer the traffic via the first network, a slave mode to be enabled on the second device,
the second device being configured with a dynamic routing protocol capability and a virtual router redundancy protocol (VRRP) capability, and
the slave mode causing the second device to suppress advertisement of second routing information associated with causing the traffic to be transferred via a VRRP path of the first network;
providing, by the one or more devices and via the first device and the second device, the traffic via the dynamic routing protocol path of the first network, and in accordance with the first routing information;
determining, by the one or more devices and at a second time, that the first device is available to transfer the traffic via the first network and that the second device is not available to transfer the traffic via the first network; and
providing, by the one or more devices via the first device, based on the first device being available to transfer the traffic via the first network, and based on the second device not being available to transfer the traffic via the first network, the traffic via another path of a second network.

2. The method of claim 1, further comprising:
determining, at a third time, that the first device is not available to transfer the traffic via the first network and that the second device is available to transfer the traffic via the first network;
causing the second device to enter the master mode based on the first device not being available and the second device being available,
the master mode causing the second device to advertise the second routing information associated with transferring the traffic; and
providing, via the second device, the traffic via the VRRP path of the first network and in accordance with the second routing information.

3. The method of claim 1, where the first network includes a satellite network and the second network includes a cellular network.

4. The method of claim 1, where the another path is associated with a dynamic mobile network routing protocol.

5. The method of claim 1, further comprising:
receiving, at a third time, availability information associated with the first device and availability information associated with the second device;
determining that the first device is available to transfer the traffic via the first network based on the availability information associated with the first device and that the second device is available to transfer the traffic via the first network based on the availability information associated with the second device; and
providing the traffic via the dynamic routing protocol path of the first network based on determining that the first device is available to transfer the traffic via the first network and that the second device is available to transfer the traffic via the first network.

6. The method of claim 1, where the dynamic routing protocol capability includes a border gateway protocol (BGP) capability.

7. The method of claim 1, further comprising:
enabling the master mode on the first device by default.

8. A system, comprising:
one or more devices to:
determine, at a first time, that a first device, of the one or more devices, is available to transfer traffic via a first network and that a second device, of the one or more devices, is available to transfer the traffic via the first network;
cause, based on the first device and the second device being available to transfer the traffic via the first network, a master mode to be enabled on the first device,
the master mode causing the first device to advertise dynamic routing information that allows the traffic to be transferred via a dynamic routing protocol path of the first network;
cause, based on the first device and the second device being available to transfer the traffic via the first network, a slave mode to be enabled on the second device,
the second device being configured with a dynamic routing protocol capability and a virtual router redundancy protocol (VRRP) capability, and
the slave mode causing the second device to suppress advertisement of VRRP routing information associated with transferring the traffic via a VRRP path of the first network;
provide, via the first device and the second device, the traffic via the dynamic routing protocol path of the first network, and in accordance with the dynamic routing information;
determine, at a second time, that the first device is available to transfer the traffic via the first network and that the second device is not available to transfer the traffic via the first network; and
provide, via the first device based on the first device being available to transfer the traffic via the first network and the second device not being available to transfer the traffic via the first network, the traffic via another path of a second network.

9. The system of claim 8, where the one or more devices are further to:
determine, at a third time, that the first device is not available to transfer the traffic via the first network and that the second device is available to transfer the traffic via the first network;
cause the master mode to be enabled on the second device based on the first device not being available and the second device being available,
the master mode causing the second device to advertise the VRRP routing information associated with transferring the traffic; and
provide, via the second device, the traffic via the VRRP path of the first network and in accordance with the VRRP routing information.

10. The system of claim 8, where the first network includes a satellite network and the second network includes a cellular network.

11. The system of claim 8, where the another path is associated with a dynamic mobile network routing protocol.

12. The system of claim 8, where the one or more devices are further to:
receive, at a third time, availability information associated with the first device and availability information associated with the second device;
determine that the first device is available to transfer the traffic via the first network based on the availability information associated with the first device and that the second device is available to transfer the traffic via the first network based on the availability information associated with the second device; and provide the traffic via the dynamic routing protocol path of the first network based on determining that the first device is available to transfer the traffic via the first network and that the second device is available to transfer the traffic via the first network.

13. The system of claim 8, where the first device includes a client edge device and the second device includes a satellite device.

14. The system of claim 8, where availability of the first device and availability of the second device are determined periodically.

15. A non-transitory computer-readable medium storing instructions, the instructions comprising:
one or more instructions that, when executed by one or more processors, cause the one or more processors to:
determine, at a first time, that a first device, of one or more devices, is available to transfer traffic via a satellite network and that a second device, of the one or more devices, is available to transfer the traffic via the satellite network;
cause, based on the first device and the second device being available to transfer traffic via the satellite network, a master mode to be enabled on the first device,
the master mode causing the first device to advertise first routing information that allows the traffic to be transferred via a dynamic routing protocol path of the satellite network;
cause, based on the first device and the second device being available to transfer traffic via the satellite network, a slave mode to be enabled on the second device,
the second device being configured with a dynamic routing protocol capability and a virtual router redundancy protocol (VRRP) capability, and
the slave mode causing the second device to suppress advertisement of second routing information associated with the traffic being transferred via a VRRP path of the satellite network;
provide, via the first device and the second device, the traffic via the dynamic routing protocol path of the satellite network, and in accordance with the first routing information;
determine, at a second time, that the first device is available to transfer the traffic via the satellite network and that the second device is not available to transfer the traffic via the satellite network; and
provide, via the first device and based on the first device being available to transfer the traffic via the satellite network and the second device not being available to transfer the traffic via the satellite network, the traffic via another path of another network.

16. The non-transitory computer-readable medium of claim 15, where the one or more instructions, when executed by the one or more processors, further cause the one or more processors to:

determine, at a third time, that the first device is not available to transfer the traffic via the satellite network and that the second device is available to transfer the traffic via the satellite network;
cause the second device to enter the master mode based on the first device not being available and the second device being available,
the master mode causing the second device to advertise the second routing information associated with transferring the traffic; and
provide, via the second device, the traffic via the VRRP path of the satellite network and in accordance with the second routing information.

17. The non-transitory computer-readable medium of claim 15, where the another network includes a cellular network and the another path is associated with a dynamic mobile network routing protocol.

18. The non-transitory computer-readable medium of claim 15, where the one or more instructions, when executed by the one or more processors, further cause the one or more processors to:
receive, at a third time, availability information associated with the first device and availability information associated with the second device;
determine that the first device is available to transfer the traffic via the satellite network based on the availability information associated with the first device and that the second device is available to transfer the traffic via the satellite network based on the availability information associated with the second device; and
provide the traffic via the dynamic routing protocol path of the satellite network based on determining that the first device is available to transfer the traffic via the satellite network and that the second device is available to transfer the traffic via the satellite network.

19. The non-transitory computer-readable medium of claim 15, where the one or more instructions, that cause the one or more processors to determine that the first device is available to transfer traffic via the satellite network, cause the one or more processors to:
determine that the first device is available to transfer traffic via the satellite network based on information indicating that the first device is at least one of:
powered on,
in an operational state,
experiencing a failure,
experiencing an error, or
associated with a particular amount of available resources.

20. The non-transitory computer-readable medium of claim 15, where the one or more instructions, when executed by the one or more processors, further cause the one or more processors to:
enable the slave mode on the second device by default.

* * * * *